United States Patent
Martin et al.

(10) Patent No.: US 6,430,920 B1
(45) Date of Patent: Aug. 13, 2002

(54) NOZZLELESS ROCKET MOTOR

(75) Inventors: Joe A. Martin, Espanola, NM (US); Larry H. Welch, Newport Beach, CA (US)

(73) Assignee: Technanogy, LLC, Newport Beach, CA (US)

( * ) Notice: Subject to any disclaimer, the term of this patent is extended or adjusted under 35 U.S.C. 154(b) by 0 days.

(21) Appl. No.: 09/447,757

(22) Filed: Nov. 23, 1999

(51) Int. Cl.[7] .................................................. F02K 9/12
(52) U.S. Cl. .......................................... 60/255; 149/17
(58) Field of Search ........................... 60/247, 253, 255; 149/17, 20

(56) References Cited

U.S. PATENT DOCUMENTS

| | | | |
|---|---|---|---|
| 3,017,746 A | * | 1/1962 | Kiphart ........................ 60/255 |
| 3,017,836 A | | 1/1962 | Guay |
| 3,250,216 A | * | 5/1966 | Typaldos ..................... 60/255 |
| 3,260,208 A | | 7/1966 | Schluter |
| 3,370,537 A | | 2/1968 | Tepper |
| 3,379,010 A | | 4/1968 | Harvey |
| 3,421,954 A | * | 1/1969 | Falconer ..................... 149/17 |
| 3,452,445 A | | 7/1969 | Higgins |
| 3,555,816 A | | 1/1971 | Leasure, Jr. et al. |
| 3,665,862 A | | 5/1972 | Lane |
| 3,685,163 A | | 8/1972 | Olt |
| 3,706,608 A | | 12/1972 | Geisler |
| 3,744,427 A | | 7/1973 | Good et al. |
| 3,745,077 A | | 7/1973 | Jones |
| 3,822,645 A | | 7/1974 | Alexander |
| 3,830,673 A | | 8/1974 | Fletcher et al. |
| 3,892,610 A | | 7/1975 | Huzinec |
| 3,995,559 A | | 12/1976 | Bice et al. |
| 4,092,189 A | | 5/1978 | Betts |
| 4,170,875 A | | 10/1979 | Edwards |
| 4,177,227 A | | 12/1979 | Harvey et al. |
| 4,241,661 A | | 12/1980 | Elrick et al. |
| 4,574,700 A | | 3/1986 | Lewis |
| 4,703,694 A | | 11/1987 | Corbett et al. |
| 5,015,310 A | | 5/1991 | Sayles |
| 5,034,070 A | | 7/1991 | Goetz et al. |
| 5,111,657 A | | 5/1992 | Hivert et al. |
| 5,251,436 A | | 10/1993 | Brogan |
| 5,739,460 A | | 4/1998 | Knowlton et al. |
| 5,867,981 A | | 2/1999 | Lewis |

FOREIGN PATENT DOCUMENTS

| | | |
|---|---|---|
| DE | 11 53 942 | 9/1963 |
| DE | 38 21 276 | 4/1993 |
| EP | 0 553 476 A1 | 8/1993 |
| EP | 0 735 013 A1 | 10/1996 |
| EP | 0 767 155 A1 | 4/1997 |
| GB | 1 290 418 | 9/1972 |
| GB | 1 530 159 | 10/1978 |
| WO | WO 96/22954 | 8/1996 |

OTHER PUBLICATIONS

C.E. Aumann, G.L. Skofronick, and J.A. Martin, entitled Oxidation Behavior of Aluminum Nanopowders, J. Vac. Sci, Technolo. B 13(3), May/Jun. 1995, pp. 1178–1183.
Abstract: XO–000789724/6001 Chemical Abstracts; "Characterization of Electro–Exploded Aluminum"; dated Aug. 31, 1998.

* cited by examiner

Primary Examiner—Louis J. Casaregola
(74) Attorney, Agent, or Firm—Knobbe, Martens, Olson & Bear, LLP

(57) ABSTRACT

A solid rocket motor for accelerating a payload comprises a motor casing and a solid propellant matrix, utilizing a high burn-rate fuel. The use of a high burn rate fuel allows the rocket motor to operate in an end-burning fashion without the use of a constricting aperture to increase the backpressure upon the burn-front of the fuel matrix. The exhaust gas produced from combustion of the propellant matrix exits directly to the ambient environment through a simple aperture without the use of an expansion nozzle. By eliminating the mass of the nozzle and allowing the use of lighter, less structurally robust motor casings, the needed acceleration of the vehicle can be achieved while using less propellant and a lighter launch vehicle.

5 Claims, 3 Drawing Sheets

NOZZLELESS ROCKET MOTOR

FIELD OF THE INVENTION

The present invention relates to solid rocket motors. In particular, the invention relates to solid rocket motors which do not require the use of an expansion nozzle to control the exhaust gases.

BACKGROUND OF THE INVENTION

Solid rocket motors operate by burning a solidified mixture comprising a fuel and an oxidizer, producing a large volume of gaseous combustion by-products. These combustion products are vented from the rocket motor at high speed, producing thrust in the opposite direction from which they escape the motor. This thrust is used to accelerate the vehicle. For example, solid rocket motor boosters are used to help accelerate the Space Shuttle at launch in order to boost the orbiter to an altitude and speed from which the main engines alone can propel it into orbit.

In typical rocket vehicles, the payload represents a very small fraction of the overall vehicle mass at launch, most of the mass consisting of propellant and engine structure. Because any required engine structure must be lifted into orbit along with the intended payload, any increase in engine structure mass requires an increase in the amount of propellant used to launch the vehicle. Engine structure is essentially payload that the engines must lift.

Because of this, a rapid increase in the amount of fuel required, and hence the overall rocket thrust required, occurs as engine mass increases. A rocket with the lightest possible structure is desirable, so that the maximum fraction of the total vehicle will consist of useful payload and propellant, rather than supporting structures. These structures, such as engines and mechanical connections, are essentially deadweight.

Despite this desire to minimize the mass of support structure in the rocket vehicle, the nature of rocket propulsion generally requires that certain structures are used in order for the rocket motor to properly function. Specifically, high internal temperatures and pressures are needed for proper combustion and efficient thrust in a typical solid rocket motor. Designing the vehicle to withstand these extremes results in additional structure, which adds mass to the rocket and reduces the payload fraction.

To produce thrust, combustion by-products are exhausted from a rocket motor through an aperture at the rear of the motor which opens into a channel. This channel is wider farther from the aperture and opens directly to the ambient environment at its farthest point from the aperture. This expanding channel is referred to as the "nozzle" of the motor. Often, the aperture is considered part of the nozzle as well.

A typical nozzle must be able to withstand not only the pressures to which it will be subjected by the combustion products of the engine, but also must withstand the high temperatures and corrosive nature of the exhaust gas flow through it. Additional aerodynamic stresses are imposed by the nozzle's passage through the atmosphere. As a result, a nozzle which can operate under these conditions often adds significant mass and complexity to a rocket's structural design. This in turn requires greater thrust, and hence a larger and more costly rocket system.

In a typical solid rocket motor, the aperture constricts the flow of the exhaust gas as it passes from the rocket motor into the expansion channel. This constriction increases the pressure on the exhaust gases, and consequently, increases the pressure within the rocket motor itself. This additional pressure caused by constriction on the exhaust gases is known as "back-pressure". Although increasing the internal pressure in the rocket requires a corresponding increase in the structural strength of the rocket motor casing, it is traditionally desirable to do so anyway. This is because the solid fuel used in a traditional rocket motor will only burn properly at pressures much higher than the ambient pressure. Without the constricting aperture providing additional back-pressure on the rocket motor, the traditional fuel grain would not burn with enough intensity to produce the desired thrust, and the fuel would be wasted. Introducing a constricting aperture into the exhaust flow path raises the pressure of the exhaust gas and provides the necessary back-pressure to ensure a fast, effective burn of the fuel.

While the aperture is used to control the pressure and expansion of the exhaust gas inside the rocket motor, the nozzle of a typical rocket motor is used to control the expansion and pressure of the exhaust gas as it leaves the rocket motor. Such control over the expansion rate of the exhaust gases is needed because traditional rockets lose much of their efficiency and thrust if their exhaust gases are allowed to vent in a turbulent manner. Ordinarily, turbulence will result when the pressure of the exhaust gas is significantly different from the ambient pressure into which the gas is vented. By expanding the exhaust gases and reducing the pressure in these gases, a nozzle minimizes the turbulence in the exhaust and increases the thrust. In the absence of a nozzle, the efficiency of a traditional motor drops to the point where the thrust produced is undesirably low.

Although it would be desirable to eliminate the additional mass and complexity of a nozzle on a rocket engine, traditional designs do not produce enough thrust to make such a design feasible for lifting a payload without the use of an expanding nozzle and constricting aperture.

SUMMARY OF THE INVENTION

In the present invention, a high burn-rate solid propellant matrix is used, eliminating the need for additional pressure inside the rocket motor and also eliminating the need to minimize exit turbulence in the exhaust gas flow. By eliminating the nozzle and aperture, mass reductions are made in the structure of the rocket, which allow for a greater payload fraction and greater mass efficiency of the rocket. The simplifications of design that are made possible also allow for more flexibility in structural design of the rocket.

In a preferred embodiment of the present invention, a rocket casing is attached to a payload. The casing is filled with a solid propellant matrix and contains at least one opening which provides an exhaust path for any combustion by-products to exhaust directly from the interior of the rocket casing to the ambient environment. When operating, the propellant matrix is ignited and burns, producing exhaust gases that vent directly through the exhaust opening, producing thrust in the opposite direction.

Additionally, the propellant matrix may be comprised of a solid homogeneous mixture of fuel particles that are distributed within a matrix of solidified oxidizer. The propellant matrix may also comprise an intimate stoichiometric mixture of oxidizer and metallic fuel particles, or it may comprise a substantially homogeneous mixture of metallic fuel particles embedded in a matrix of solid oxidizer wherein the average distance between the metallic fuel particles is controlled.

The propellant matrix may also be formed such that the burning surface is initially located at the lower, or exhaust end of the rocket, and progresses as it burns toward the top, or payload end, of the rocket.

In a further preferred embodiment, the rocket casing comprises a consumable material, such that the casing will burn away as the propellant matrix is consumed and the casing is exposed to the heat and pressures of the exhaust gases.

In another preferred embodiment, a solid rocket motor comprises two solid propellant matrices, one inside the other. The outer matrix is stiffened and formed into a casing for the inner matrix, and is attached to the payload to be accelerated. The inner fuel matrix is designed to have a higher burn rate than the outer fuel matrix, so that the inner matrix remains contained within the outer matrix throughout the operation of the motor.

Another preferred embodiment of the present invention is a system wherein solid fueled booster rockets are used to accelerate a payload delivery means, and each booster makes use of a solid propellant matrix within a casing and a direct opening from the interior of the rocket casing to the ambient environment. Such boosters are attached to the payload delivery means and provide thrust for said payload delivery until they burn out and are jettisoned.

DETAILED DESCRIPTION OF THE PREFERRED EMBODIMENTS

Nozzleless Design Structure

Figure 1:
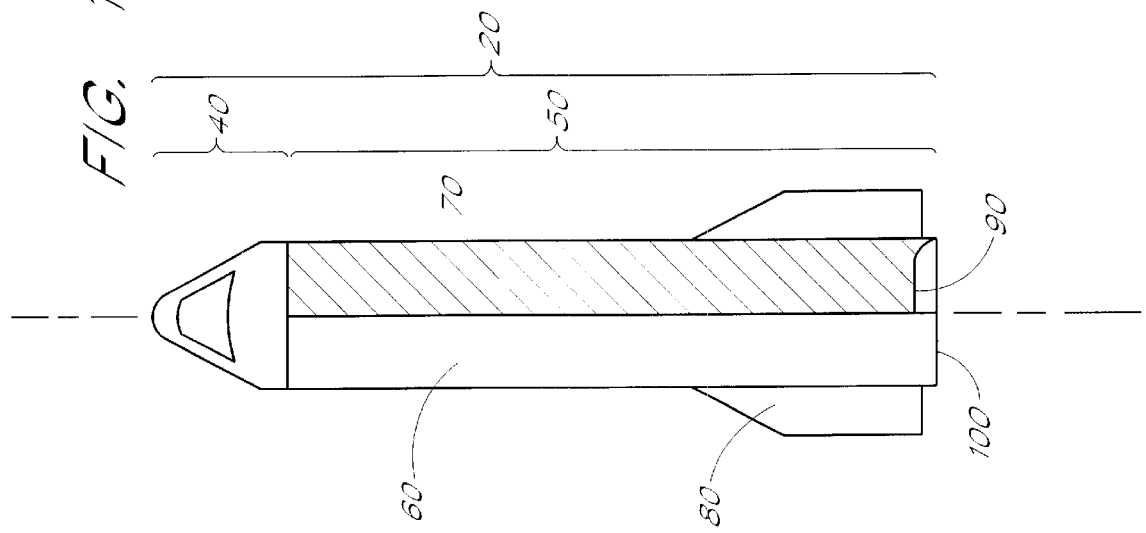
FIG. 1 shows a cut-away view of a nozzleless solid rocket motor in schematic form.

FIG. 1 shows a schematic diagram of a rocket vehicle (20) that makes use of a nozzleless design. The vehicle (20) comprises a payload (40) and a motor (50). Those skilled in the art will recognize that the nature of the payload will vary with the purpose of the rocket vehicle. Possible payloads include, but are not limited to, manned capsules, satellites to be deployed, materials to be delivered into Earth orbit, test articles, or any other cargo or package which requires delivery by means of a rocket engine.

The rocket motor (50) comprises, at a minimum, a motor case (60) and a propellant matrix (70). Means for controlling the path of the rocket are also often included, and are represented schematically as fins (80) located on the lower end of the motor case (60). Those skilled in the art will recognize that such control means need not be lower mounted aerodynamic fins, and could include, but are not limited to, fins mounted in other positions, such as higher on the case, or even on the payload end of the vehicle, as well as attitude control thrusters or attitude control systems other than fins or thrusters.

The propellant matrix (70) is contained within the motor case (60), which is generally sealed on the end which will be forward during flight, and open on the end which will be rearward during flight. As the propellant grain burns at its exposed surface (90), or "burn-front", combustion by-products will be produced and expelled from the motor. These gases will pass through the exhaust aperture (100) at the rear of the vehicle, and exit the motor (50) at high speed, providing thrust and accelerating the vehicle.

The propellant compositions used in accordance with preferred embodiments of the present invention comprise a substantially homogeneous mixture of micron or nanometer-sized particles of metallic fuel particles distributed throughout a matrix of an oxidizer in solid form. A homogeneous mixture, as that term is used herein, means a mixture or blend of components that is generally uniform in structure and composition with little variability throughout the mixture. Different portions of a homogeneous mixture exhibit essentially the same physical and chemical properties at every point throughout the mixture. The stoichiometry in a homogeneous mixture is also substantially constant throughout the mixture.

Another way of describing the preferred propellant compositions is to say that the metallic fuel and oxidizer are intimately mixed. Intimately mixed, as that term is used herein, means that the two components are present in a structure that is not composed of discrete particles of the two materials, instead the metallic fuel is embedded within a network, crystal, or crystal-like structure of the oxidizer such that the two components cannot be unmixed by general physical methods, e.g. unmixing requires re-solvating or dispersing the oxidizer in a solvent.

In especially preferred embodiments, the propellant comprises a propellant composition called "NRC-3 or NRC-4." Because these two propellant compositions are identical, for purposes of this discussion, they are used interchangeably. In NRC-4, the metallic fuel is aluminum particles having an average diameter of about 40 nm, and the oxidizer is ammonium perchlorate (AP). The aluminum and AP components of NRC-4 are present in stoichiometric quantities, that is, they are present in the quantities needed for reaction, without an excess of any component left over after the reaction.

NRC-4 is preferably made by making a solution of the AP oxidizer in water, and then adding the aluminum particles to the oxidizer solution. The resulting mixture is agitated or otherwise mixed, to produce a substantially homogeneous mixture. The water is then removed from the mixture by freeze drying, as to maintain the homogeneous nature of the mixture, which results in a powdered solid in which the aluminum particles are distributed generally uniformly throughout the solid AP oxidizer matrix. This may also be characterized as controlling the average distance between the metallic fuel particles in the propellant composition.

EXAMPLE 1

Preparation of AP/Aluminum Nanoparticle Matrix (NRC-3 and NRC-4)

Two 50 gram batches of ammonium perchlorate/nanoaluminum matrix were sequentially prepared, each by dissolving 25 grams of ammonium perchlorate (0.5 gram, 99.9% pure, Alfa Aesar stock #11658) in 0.5 liters of deionized water to form a solution having a concentration of approximately 0.4 moles/liter. As in the previous examples, the specific concentration achieved is not critical as long as the solution is well below the saturation point, to ensure that all of the ammonium perchlorate dissolves. To this solution was added 25 grams of nanoaluminum of average particle diameter 40 nm. The quantities of ammonium perchlorate and nanoaluminum were selected so as to yield a stoichiometric ratio of the ammonium perchlorate to the unoxidized aluminum in the nanoaluminum particles. The mixture was agitated by mechanical shaking to ensure that the particles were completely immersed and that the mixture was substantially homogeneous. The mixture of nanoaluminum particles in ammonium perchlorate solution was then rapidly frozen by pouring the mixture into a container of liquid nitrogen. The container of liquid nitrogen and frozen mixture was then transferred to a vacuum container capable of achieving a base pressure of $10^{-5}$ Torr or lower in order to achieve low enough pressure to achieve rapid freeze drying. The vacuum system used was a custom pumping station using a Varian VHS-6 oil diffusion pump, a Leybold-Heraeus TRIVAC D30A roughing/backing pump, and a 16-inch diameter×18-inch tall stainless-steel bell jar. Active pumping on the vacuum container was immediately initiated after pouring the agitated mixture into the liquid nitrogen. After a period of 10 minutes, the pressure in the system achieved a steady-state pressure, stabilizing near the equilibrium vapor pressure of the frozen water, i.e., $10^{-3}$ Torr. The pressure was maintained at this steady state while the frozen water in the mixture was removed from the mixture by sublimation. After 120 hours removal of the water was complete. It is likely that the time required for water removal can be shortened to some extent by modifying the pouring process to yield a frozen mass of high surface area; i.e., thin, flat frozen masses as opposed to a single monolithic lump of frozen material. Small, thin frozen masses are expected to dehydrate more quickly during freeze drying than a single, monolithic mass of equivalent weight due to the larger surface area that is exposed by having many small masses relative to the surface area of a single large mass. The resulting processed material of each batch consisted of about 50 grams of low-density, dry agglomerates of particles of ammonium perchlorate/nanoaluminum matrix (labeled NRC-3 and NRC-4, respectively).

By changing the size of the aluminum particles used in a propellant composition made according to procedures such as described above, propellants having different performance characteristics may be made. This is because reaction rates, such as the burn rate of a particulate propellant mixture, correspond to the reactant diffusion distance, which corresponds to particle size in particulate materials. Thus, as compared to a propellant using aluminum fuel particles 100 nm in diameter, a propellant using aluminum fuel particles on the order of 30 microns would burn more slowly, release its energy more slowly, and a given mass of propellant would burn over a longer period of time. Conversely, a propellant having aluminum fuel particles of 50 nm would burn faster than the propellant having 100 nm fuel particles, providing greater power in a shorter period of time. Therefore, by choosing the proper size metal fuel particles to include in a propellant composition, a propellant could be made having desired performance characteristics. For the avoidance of doubt, these statements assume that all other things in the propellant, other than particle size, are equivalent.

When changing particle size, one must take the passivation layer into account in order to maintain the correct stoichiometry. When the aluminum is in the form of micron-sized particles, the $Al_2O_3$ passivation layer, which is approximately 2.5 nm thick, is practically negligible in weight compared to that of the unoxidized metallic aluminum within the particle. However, when the aluminum is in the form of nanometer-sized particles, the aluminum oxide passivation layer can comprise a substantial portion of the total weight of the particle, e.g., 30 to 40 wt. % or more. Therefore, when nanometer-sized particles are used, less oxidizer per unit weight aluminum fuel is needed for a stoichiometric mixture.

Another way of making a propellant having desired performance characteristics, or of varying the performance characteristics of a particular propellant such as NRC-4, is to make a mixed propellant, comprising at least two fuel/oxidizer propellant mixtures. A two component mixed propellant will generally comprise a faster burning propellant component and a slower burning propellant component, at least one of which is a substantially homogeneous mixture of metallic fuel particles distributed throughout a matrix of an oxidizer in solid form, as described above. Additionally, in each of the propellant components, the fuel and oxidizer is preferably present in stoichiometric quantities. The propellant components may have one or more materials in common. For example, a preferred two-component mixed propellant is one which comprises 200 nm aluminum in a matrix of AP as the faster burning propellant component, and 30 micron aluminum in a matrix of AP as the slower burning propellant component. Another preferred two-component mixed propellant is that which comprises 85% by weight of NRC-4 as the faster burning propellant component and 15% by weight of the slower burning propellant component comprising hydroxy-terminated polybutadiene (HTPB) and AP in stoichiometric quantities. However, any fuel/oxidizer propellant may be used, and mixed propellants may contain more than two propellant components.

When a propellant formulation comprises two propellant components, a faster burning propellant component and a slower burning propellant component, it will burn at a rate that is dramatically limited by the burn rate of the slower burning propellant component. If the burn rate of both components is known, the amount of each component needed to create a propellant of a desired burn rate may be approximated by using Equation 2:

$$R = m_{total}/t = \frac{(m_f + m_s)}{m_f/R_f + m_s/R_s} \quad \text{(Eq. 2)}$$

wherein R is the desired burn rate, $m_s$ is the mass of the slower burning propellant component, $m_f$ is the mass of the faster burning propellant component, $R_s$ is the burn rate of the slower burning propellant component, and $R_f$ is the burn rate of the faster burning propellant component. Although these burn rates are in terms of mass per unit time, burn rate may also be expressed in terms of length per unit time as in the data presented herein. Because Equation 2 is based upon several assumptions, the results regarding observed rates or needed quantities may vary slightly from the calculated values. In some circumstances, it may be desirable to optimize the formulation calculated using the equation above. Optimization may be done experimentally by preparing mixed propellants and testing them in the laboratory or in the field. By using a relation such as Equation 2 and/or the principles embodied therein, the burn rate characteristics of a mixed propellant can be "tuned" to fit a particular application or use, dependent upon the amount of propellant components added and the difference in burn rate between the faster and slower burning propellant components.

For presently preferred applications, HTPB/AP is used as the slower burning propellant component due to its low cost, availability, and well-understood properties. However in some motors it may be desirable to use a slower burning propellant component having a burn rate faster than that of HTPB/AP, i.e. one having a burn rate closer to the faster burning propellant component. One advantage in using such materials is that it is easier to fine tune the mixed propellant and to manufacture consistent batches of mixed propellant, because each gram of HTPB/AP propellant has a higher net effect than each gram of a slower burning propellant component having a burn rate faster than HTPB/AP, as can be demonstrated using Equation 2. For example, one may substitute a homogeneous mixture of 30 micron aluminum particles in a matrix of AP for HTPB/AP as the slower burning propellant component when used with NRC-4 as the faster burning propellant component. Because the propellant comprising 30 micron aluminum as the fuel is closer to the burn rate of NRC-4 than a propellant having HTPB as the fuel, relatively small changes in composition will result in smaller changes in overall mixed propellant performance.

The two or more components in a mixed propellant are preferably mixed together to achieve a substantially consistent, well-mixed mixture. Such a mixture of components in the mixed propellant helps to avoid having uneven burn rates, power or other properties in large portions of the propellant bulk. If one or more components are present in a quantity or form that makes it difficult to achieve consistent mixing or a consistent composition in the mixture, one may achieve a well-mixed propellant by use of a solvent. In using a solvent to aid mixing, one combines the various components of the propellant in the solvent, mixes the resulting mixture by agitation, stirring, sonicating, etc. to form a solution/suspension, and then removes the solvent. A solvent used to aid mixing is chosen for its compatibility with one or more of the components of the mixture, such as miscibility with a component or ability to dissolve a component. Preferred solvents will not substantially react with the fuel, oxidizer, or other components of the propellant mixture. For propellant compositions comprising aluminum, AP and HTPB, such as the preferred mixed propellant composition disclosed above, preferred solvents include nonpolar solvents such as hexane or pentane. Because the solvent is removed by evaporation, such as in open air, under reduced pressure, with application of heat or other method as is known in the art, solvents having a low boiling point or high vapor pressure are preferred.

EXAMPLE 2

Preparation of Propellant Mixture

A small-scale, 1-gram batch of propellant was prepared by dissolving 0.047 gram of HTPB into 15 ml of reagent grade hexane in a capped, cylindrical glass container of approximately 25 ml volume. To this solution, 0.103 gram of AP (3-micrometer particle size) was added, followed by 0.85 gram of NRC-3. The resulting mixture was sonically mixed for about 10 minutes. The hexane was removed by evaporation in air with warming to about 40 C., to leave a solid propellant material.

It is well known in the propellant industry that propellants generally burn faster at higher pressure. The behavior is usually described by the formula $$R_b = C P^n,$$

where $R_b$ is the burn rate, C is a constant, P is pressure, and n is the pressure exponent. It is further widely known in the industry that the value of the pressure exponent for a candidate propellant is critical to the utility of the propellant in rocket motors. In particular, if the value of the pressure exponent for a candidate propellant is 1 or greater, the candidate propellant is unsuitable as a rocket propellant, as the burn rate will increase uncontrollably as pressure builds and will thus lead to an explosion. On the other hand, if the exponent is 0.6 or lower, the candidate propellant will be relatively stable in typical rocket motor environments.

The burn rate and pressure exponent of the propellant produced in Example 2 was determined by measuring the burn rate at high density at various pressures by pressing the propellant into pellets and measuring the burn rate in a sealed pressure vessel at various applied pressures. Several high-density pellets were formed from the propellant mixture of Example 2 by pressing nominally 0.080 grams of the propellant mixture for each pellet into a cylindrical volume measuring 0.189 inches in diameter and approximately 0.1 inches long, using a hydraulic press and stainless steel die assembly. A density of approximately 1.7 grams per cubic centimeter was obtained by applying a force of 400 pounds to the die. A free-standing, cylindrical pellet, thus formed, was removed from the die by pushing the pellet out of the die.

The burn rate of a free-standing pellet can be measured by burning the pellet in a confined volume and measuring the pressure rise as a function of time in the volume. As the pellet burns, the product gases formed by the propellant will cause the pressure in the confined volume to increase until the burn is complete. By measuring the length of the pellet before the burn and measuring the time interval during which the pressure increases during the burn in such a volume, the average burn rate of the propellant can be calculated by dividing the pellet length by the time interval that the pressure was increasing. Performing such measurements with the confined volume pre-pressurized with a non-reactive gas (e.g., dry nitrogen) yields burn rates at elevated pressures that can be used to calculate the pressure exponent for the propellant.

EXAMPLE 3

Burn Rate Testing and Pressure Exponent Determination of Propellant Mixture

Three pellets fabricated from the powder prepared in Example 2, as described above, were separately burned in a stainless steel pressure vessel of 350 cubic centimeters, to determine burn rate and the burn rate exponent for the propellant mixture. The pressure vessel contained a pressure transducer (Endevco, 500 psig) and two electrical connectors to which a hot wire igniter (nichrome wire, 3 inches long by 0.005 inches in diameter) was attached. In each of separate tests, the igniter wire was first taped to the flat bottom of the pellet, the igniter wire (with pellet) was attached to the electrical connectors inside the pressure vessel, and the vessel was sealed. The pellet was ignited by passing a 3-amp DC current through the electrical connectors, causing the igniter wire to heat and ignite the propellant. Pressure in the vessel was recorded as a function of time by measuring the electrical output of the pressure transducer with a digital oscilloscope (Tektronix, model TDS460A). One of the pellets was burned at the ambient atmospheric pressure of the laboratory. The other two pellets were burned after pre-pressurizing the vessels with dry nitrogen to 125 and 300 pounds per square inch, respectively. Pellet weight, pellet length, pellet density, burn time, and average pressure during the burn for the three pellets are shown in Table 1.

TABLE 1

High-Density Burn Rate Results

| Weight (g) | Length (in.) | Density (g/cc) | Time (sec) | Burn Rate (in/sec) | Pressure (psig) |
|---|---|---|---|---|---|
| 0.060 | 0.080 | 1.63 | 0.0286 | 2.80 | 16.6 |
| 0.080 | 0.107 | 1.63 | 0.0132 | 8.11 | 167.5 |
| 0.085 | .112 | 1.65 | 0.0111 | 10.08 | 338.1 |

A least-squares polynomial fit of the data in Table 1 reveals that the burn rate for this propellant varies as $$R_b = (0.8374)P^{(0.4337)},$$

Where Rb is burn rate in inches per second and P is pressure in pounds per square inch. The pressure exponent, n, for this propellant mixture is approximately 0.43 (i.e., n<0.6), suggesting the mixture should be acceptable for rocket motor applications, from a pressure-dependence perspective.

In order to compare propellant formulations of the present invention, both to each other and to the prior art, a simple laboratory scale test was devised. The propellant compositions tested were made according to the solvent-based method described above. The test allows for the measurement of properties relevant to the performance of a propellant, such as burn rate, average thrust, and Propulsion Potential (Isp at very low, near ambient pressures). The test provides for the measurement of weight (force) and time while the propellant is being burned in a mini-motor. Because some properties may be dependent in part upon factors including the size and/or aspect ratio of the motor, particular motor configurations were chosen for use in the tests. One configuration chosen for the mini-motor was a stainless steel tube having an internal diameter of 0.19 inches and an aspect ratio of about 12:1 (length to internal diameter). Another series of tests were done using the same 0.19 inch ID stainless steel tubing in which the aspect ratio was about 5:1.

To perform the test, a section of the 0.19 inch ID stainless steel tubing was cut to a length (within about 5%) to provide a motor having the desired aspect ratio for that series of tests, and filled with propellant to make the motor. The filling was done by placing the propellant into the tube, and then tamping or packing it down into the tube, first by hand and then by means of a laboratory press. A sleeve was placed on the tube to provide balance and support, which was then placed on an electronic balance and zeroed. The motor was then ignited and the mass or force, in grams, was measured as a function of time. From these data points, the mass of propellant, burn time, burn rate average thrust and Propulsion Potential were be calculated.

The tests comparing two NRC-4 formulations to three more conventional propellant formulations were performed as discussed above, and used mini-motors having an aspect ratio of approximately 5:1 (length to internal diameter). The results of the tests are set forth in Tables 2 and 3 below.

TABLE 2

NRC-4 Propellants in the 5:1 Mini-Motor

| | Composition | Propellant (g) | Burn rate (in/sec) | Burn Time (sec) | Average Thrust (g) | Propulsion Potential (sec) (Isp) |
|---|---|---|---|---|---|---|
| 1 | 65% NRC-4; 11.1% HTPB; 23.9% 3μ AP | 0.574 | 0.395 | 1.98 | 5.814 | 20.1 |

TABLE 2-continued

NRC-4 Propellants in the 5:1 Mini-Motor

| | Composition | Propellant (g) | Burn rate (in/sec) | Burn Time (sec) | Average Thrust (g) | Propulsion Potential (sec) (Isp) |
|---|---|---|---|---|---|---|
| 2 | 60% NRC-4; 12.6% HTPB; 27.4% 3μ AP | 0.564 | 0.373 | 1.86 | 5.901 | 19.5 |

TABLE 3

Conventional Propellants in the 5:1 Mini-Motor (no intimate mixing of Al/AP)

| | Composition | Propellant (g) | Burn rate (in/sec) | Burn Time (sec) | Average Thrust (g) | Propulsion Potential (sec) (Isp) |
|---|---|---|---|---|---|---|
| 1 | 19% 30μ Al; 69% 200μ AP; 12% HTPB | 0.935 | 0.030 | 38.56 | 0.025 | 1.0 |
| 4 | 19% 5μ Al; 69% 3μ AP; 12% HTPB | 0.662 | 0.059 | 17.52 | 0.057 | 1.5 |
| 5 | 19% 3μ Al; 69% 3μ AP; 12% HTPB | 0.630 | 0.064 | 15.82 | 0.098 | 2.5 |

Much of the discussion presented herein is in terms of burn rate. This is because the burn rate of a material is highly indicative of its properties and suitability as a propellant. However, for experimental purposes, one generally uses the specific impulse (Isp) for comparison. The Isp takes the amount of the propellant material tested into account, thus allowing for a direct comparison between the various formulations and tests for which there may be slight differences in the quantity of the material used.

It should be noted herein that the data presented in Tables 2 through 5 for the propellant formulations are values that were measured when the propellant was combusted under a very low, near ambient pressure. No nozzle or other flow restrictor was placed on the tubes during burning, nor was there any other method used to increase the pressure of the material during combustion. This differs from the general practice in the aerospace industry, wherein Isp values are generally measured at a pressure of 1000 psi and reported as such, oftentimes without indication that such elevated pressure was used. If the pressure is increased, one expects the burn rate to increase, which would lead to an increase in measured Isp due to the relation between the two properties. Therefore, in the discussion which follows the measured Isp at near-ambient pressures will be termed "Propulsion Potential" to avoid confusion with and distinguish from the industry-standard high pressure Isp measurements.

Table 2 presents the results of tests on two propellant formulations of the present invention using NRC-4 powder. The amount of AP listed in the composition is the stoichiometric amount of AP for the HTPB present, that is the amount of AP needed to react the HTPB only. The NRC-4, as discussed supra includes AP in a quantity sufficient to react with all the aluminum component thereof. Table 3 presents the results of tests on three more conventional propellant formulations in which the components as listed are micron-sized and are mixed together and cast into the tubes without curing. The AP listed in the formulations of Table 3 is the stoichiometric amount for both the Al and HTPB present. The formulations in Table 3 do not comprise the intimate, homogeneous mixtures of aluminum and AP of the compositions of the present invention, including NRC-4. All compositions in both tables, however, have about 12% HTPB. All percentages herein are by weight.

The results of Table 3 demonstrate the effect of particle size, and thus reactant diffusion distance, as discussed herein. Formulation 3, comprising 30μAl and 200μAP has the largest particle sizes, followed by formulation 4 having 5μAl and 3μAP, and finally by formulation 5 having 3μAl and 3μAP. It can be seen from Table 3 that the Propulsion Potential increases as the particle size decreases, indicating that the lower particle size formulations would provide more powerful fuels.

An additional factor which may be at work is the difference in the particle sizes. In formulation 3, the AP particles are, on the average, about 6–7 times larger than the Al particles. In formulation 5, the particles of Al and AP have the same average diameter. The size difference between the particles in formulation 3 would make homogeneous mixing of the fuel and its oxidizer difficult, which could also, or alternatively, account for its lower Propulsion Potential and lower burn rate.

Comparison of the data in Table 2 to formulation 5 in Table 3 shows that the Propulsion Potential is increased about 8-fold when the fuel and its oxidizer is in the form of an intimate, substantially homogeneous mixture of nanoaluminum and AP according to a preferred embodiment (NRC-4) of the present invention. In these formulations, the NRC-4 provides small fuel particle size, on the order of about 40 nm, as well as low reaction diffusion distance because the nanoaluminum is dispersed throughout the AP oxidizer phase in a substantially uniform fashion. In preferred embodiments of fuel/oxidizer matrix compositions, such as NRC-4 and similar compositions comprising larger, micron-size fuel particles, the concerns regarding obtaining a homogeneous mixture of fuel and oxidizer seen in formulation 3 are minimized, because the composition itself, having the fuel particles dispersed throughout the oxidizer phase provide a mixture which is substantially homogeneous, intimate, and of the correct stoichiometry.

Thus, it can be seen that the preferred propellants have very high energy, power, and burn rate as compared to propellants comprising more standard-like particle mixes.

Several additional mixed propellants, comprising two components (i.e. propellants, fuel/oxidizer mixture), have been prepared, and tested according to the general procedure described above. The propellants made had varying amounts of low and high burning rate propellant components. The composition is listed in the tables in terms of the quantity of NRC-4 present, expressed as a percentage by weight. The remainder of the propellant comprises HTPB and its stoichiometric quantity of AP. The mixed propellants were made by mixing the various components together in the presence of nonpolar solvent which is later evaporated, as described above. The HTPB in the propellant formulations was used neat, without a curing agent, such that the propellant could be loaded into the test motor immediately after mixing and burned thereafter, without having to wait for the material to cure, although it was not a necessity that the loading and testing be done immediately following mixing. Additionally, burn rate catalyst was not added to the propellant mixtures tested herein. The results of these experiments are presented in Tables 4 and 5 below.

TABLE 4

NRC-4 Containing Propellants in the 12:1 Mini-Motor

| % NRC-4 | Propellant (g) | Burn rate (in/sec) | Burn Time (sec) | Average Thrust (g) | Propulsion Potential (sec) (Isp) |
|---|---|---|---|---|---|
| 70 | 1.519 | 0.933 | 1.59 | 30.527 | 31.9 |
| 60 | 1.411 | 0.434 | 4.56 | 35.626 | 25.2 |
| 50 | 1.770 | 0.250 | 8.57 | 1.888 | 9.1 |

TABLE 5

NRC-4 Containing Propellants in the 5:1 Mini-Motor

| % NRC-4 | Propellant (g) | Burn rate (in/sec) | Burn Time (sec) | Average Thrust (g) | Propulsion Potential (sec) (Isp) |
|---|---|---|---|---|---|
| 65 | 0.574 | 0.395 | 1.98 | 5.814 | 20.1 |
| 60 | 0.564 | 0.373 | 1.86 | 5.901 | 19.5 |
| 50 | 0.443 | 0.361 | 1.97 | 2.041 | 9.1 |
| 40 | 0.537 | 0.182 | 5.22 | 0.403 | 3.9 |
| 35 | 0.568 | 0.139 | 7.19 | 0.265 | 3.4 |
| 20 | 0.615 | 0.056 | 19.17 | 0.053 | 1.7 |

As can been seen in the tables above, relatively small changes in the composition of the propellant (ratio of high and low burn-rate components) can have a dramatic effect on the Propulsion Potential when the propellant is combusted. Furthermore, tests such as those above can be used to aid in devising a formulation to achieve particular results. Using the data above, for example, if one wanted to make a propellant having a Propulsion Potential of 5, one would need to prepare a propellant having a little over 40% NRC-4 by weight if a 5:1 mini motor were used. The formulation required may be found more exactly by methods known in the art, including fitting the experimental data to an equation or iteratively by preparing and testing additional formulations within the narrowed ranges determined using the data above.

The results of additional experiments conducted by the Inventors are presented in Appendix 1 hereto. These tests were conducted using laboratory scale mini-motors of varying aspect ratios, some of which also comprised a flow-restricting nozzle. Appendix 1 details the formulation (%NRC-3/4 to %HTPB with its stoichiometric quantity of AP), the mass of the propellant in grams, the density at which the propellant is packed in the motor casing, the pressure in the combustion chamber, whether there was a nozzle present, the orifice size of the nozzle, the length of propellant in the motor casing, the burn time, the burn rate, the aspect ratio, the thrust, and the Isp for several different mixed propellant compositions. The blank spaces indicate where particular data is unavailable or not applicable.

This data and the other information set forth herein support the proposition that reasonable thrust is achievable at lower pressures. While a typical thrust analysis of a conventional rocket motor involves a high pressure component, one should realize that this higher pressure at which combustion occurs is not achieved without a loss of energy in the exhaust gases. That is, such higher pressures are typically achieved by means of throat or a nozzle which "chokes" the flow of the exhaust gases. True, such a nozzle increases the speed of the gases through the nozzle but it also decreases the energy of other gases which impinge on the narrowed throat structure. This in turn results in an increased pressure which heretofore has been necessary to increase the burn rate.

However, given a chemical reaction which produces sufficient energy and higher burn rates at lower, say near ambient pressures, there is no reason why reasonable thrust cannot be achieved without a nozzle and the associated higher pressure. In other words, the kinetic energy of the combustion, which produces expanding gases having a given mass moving at a high velocity, is sufficient to produce the momentum transfer necessary to achieve reasonable thrust. This is achieved in the present case by relatively high burn rates at near ambient pressures, which burn rates were not previously achievable without higher pressures. Of course, at higher pressures which could be achieved with some type of throat or nozzle device, even higher burn rates are likely to be achievable. Thus, rocket motors utilizing propellants of the type described herein operating at pressures other than ambient or near ambient are also within the scope of the preferred embodiments.

Additional details not necessary to repeat here are disclosed in assignee's copending applications entitled COMPOSITION AND METHOD FOR PREPARING OXIDIZER MATRIX CONTAINING DISPERSED METAL PARTICLES, application Ser. No. 09/447,703, and VARIABLE BURN-RATE PROPELLANT, application Ser. No. 09/448,546, filed on the same date as the present application, the entireties of which are hereby incorporated by reference.

End Burning Configuration

Figure 2:
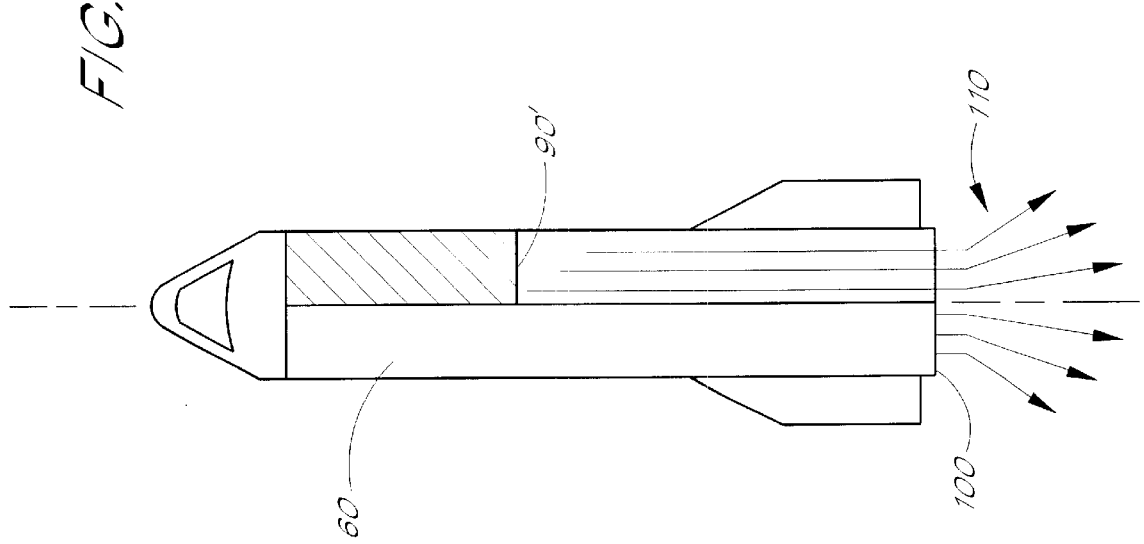
FIG. 2 shows the motor of FIG. 1 in schematic form, at a time after ignition while the motor is operating.

After the propellant matrix is ignited and the rocket motor is operating, the burn-front (90) will progress through the propellant matrix (70), in a direction substantially perpendicular to the surface of the burn-front itself. FIG. 2 shows a schematic representation of the rocket at some point during its operation, after a quantity of the fuel matrix has been consumed. The current burn-front (90') is located at a higher position within the case (60), at the current exposed surface of the propellant matrix (70). The lower portion of the propellant has already been consumed. The plume of exhaust gases (110) is shown exiting the case (60) of the rocket through the rearward exhaust aperture (100).

In accordance with a further preferred embodiment of the present invention, the propellant matrix is constructed into an end-burning configuration. In such a configuration, the burn-front (90) is substantially perpendicular to the direction of thrust produced. This results in the burn-front generally progressing from the rear, or exhaust (100) end, of the rocket motor toward the front, or payload (40) end, of the motor.

The end-burning configuration reduces the loads imposed upon the rocket casing (60), and therefore reduces the strength needed for its design. This is because the pressure produced by the burning propellant is lower than in a comparable center perforated (CP) design for a solid rocket motor, and so the case need not support the same degree of internal loading that would be required in a CP design.

The reduced strength requirements for the propellant casing of the present invention broaden the range of materials and configurations available for the propellant casing. Unlike the heavy propellant casings of CP rocket motors, which must be composed of high-strength steel or composite materials to maintain and withstand the required high operating pressures, the propellant casing in the illustrated embodiment of the end-burning rocket motor can be lightweight.

Because the propellant compositions of the illustrated embodiment provide ample thrust at low operating pressures, even with only ambient back-pressure, the propellant casing does not need to maintain or withstand high operating pressures. The lower operating pressure of the end-burning rocket motor also lessens the requirements for an expanding nozzle structure. In a traditional solid rocket motor, the rocket casing also provides structural stability for the propellant. However, the shape of an end-burning propellant matrix allows for the propellant to have greater structural stability than a comparably sized CP propellant matrix. By using such a propellant configuration, which is able to support itself more effectively with its own non-negligible structural stability, the required rigidity of the propellant casing is correspondingly lessened.

Due to these lower stress requirements, the casing need not be composed of steel or high strength composites, but could instead be built using plastics or other lightweight materials. Additional details not necessary to repeat here are disclosed in assignee's copending application entitled END-BURNING ROCKET MOTOR, application Ser. No. 09/447,758, filed on the same date as the present application, the entirety of which is hereby incorporated by reference.

Operation

Through the use of a high burn-rate propellant and an end-burning motor, a preferred embodiment can make use of a design that does not entail the use of a restricting aperture or an expansion nozzle at the exhaust end of the rocket motor. Referring to FIG. 2, during operation of the motor the exhaust plume (110) vents directly to the ambient environment through the rear aperture (100) of the rocket without passing through any intermediate flow control devices.

Because the fuel matrix (70) is composed of a propellant material which burns suitably using only the ambient back-pressure, there is no need to provide additional constriction of the exhaust path between the burn-front (90') and the aperture (100) to the ambient environment. Although it is possible that some additional back-pressure may be created because of the depth of the rocket casing or because of structural requirements at the aperture, those skilled in the art will recognize that such back-pressure is incidental to the design of the rocket motor and does not represent the use of a constricting aperture.

As the exhaust gases (110) pass through the exhaust aperture (100), they will undergo a rapid expansion to reach the ambient pressure of the environment into which they are exhausted. This expansion is ordinarily controlled through the use of an expansion nozzle. However, in a preferred embodiment of the invention, such expansion is allowed to occur without benefit of a nozzle.

Without a nozzle, the flow will undergo a turbulent expansion, which may reduce the efficiency of the propellant; all available energy in the exhaust plume may not be converted into thrust. However, because the motor does not need to accelerate the mass of the nozzle and its associated structures, the overall acceleration imparted to the vehicle can be higher than with an equivalent burn in a traditional rocket motor using a nozzle. So while the propellant may not be used as efficiently per pound without a nozzle, the weight saved by not incorporating a nozzle allows less total propellant to accomplish the same job, making the vehicle as a whole more efficient.

Consumable Casing Design

In a further preferred embodiment, it is possible to construct the rocket casing itself out of a substance that is consumed progressively along with the propellant matrix. Such an embodiment can be seen in FIG. 3. A consumable case rocket vehicle (20') is shown, comprising a payload (40') and a consumable case motor (50'). At launch, the solid rocket motor (50') comprises a propellant matrix (70) and a rocket motor casing (60') which is made of a material which is designed to be consumed when subjected to the temperatures and pressures which will be found in the exhaust gases (110). When ignited, the propellant matrix (70) will burn at its exposed burn-front (90), and combustion by-products will exit the rocket through an exhaust aperture (100).

Figure 4:
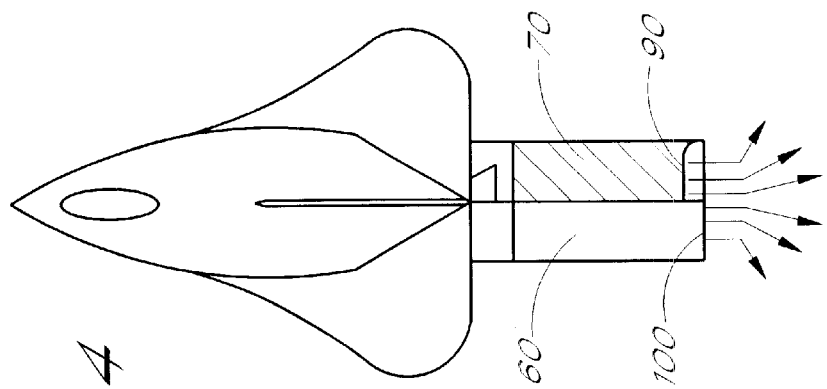
FIG. 4 shows the rocket motor of FIG. 3 in schematic form, at a time after ignition while the motor is operating.
Figure 3:
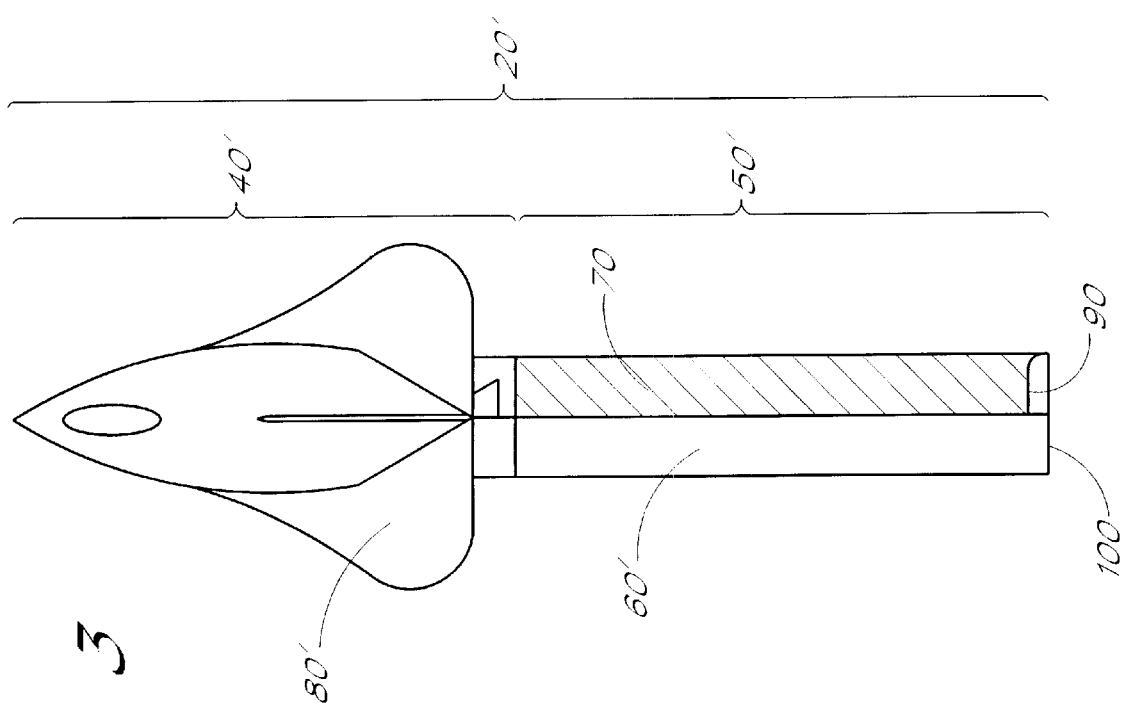
FIG. 3 shows a cut-away view of a consumable case solid rocket motor in schematic form.

Referencing FIG. 4, which shows operation of the rocket motor design of FIG. 3, the burn-front (90') will progressively advance forward through the propellant matrix (70). However, unlike the embodiment shown in FIGS. 1 and 2, the casing (60') of the motor will be progressively consumed as it is exposed to the heat and pressure of the exhaust plume (110). This will result in the overall size and mass of the rocket vehicle (20') becoming smaller as the motor operates and the propellant matrix (70) and casing (60') burn away. Because of the progressive consumption of the motor casing, the aperture (100') through which the exhaust plume (110') exits the motor casing will also shift forward toward the payload (40') end of the vehicle.

By consuming the rocket casing (60') as the propellant burns away, the vehicle always remains as light as possible, maximizing the propulsive effect of the fuel which is being burned. Because any part of the casing that is no longer needed to contain the propellant matrix is consumed, the minimum amount of structure is being lifted at all times.

Because the casing will be consumed, and in particular, the lowest portions of the casing will be consumed first, any means which are used to control the attitude or path of the vehicle must be mounted to a non-consumable part of the payload, rather than to a consumable component, such as the consumable casing. This is demonstrated schematically by the placement of the control surfaces (80') upon the payload (40') rather than upon the casing (60') of the rocket vehicle. It will be understood by those skilled in the art that the attitude control means need not be limited to fins or any other aerodynamic device, but merely that whatever means are provided for controlling the attitude of the vehicle, they should not be consumed with the rocket motor casing.

Materials which could be used to manufacture the consumable casing include lightweight plastics with melting points below that found in the exhaust plume, or thin metallic sheeting which gradually vaporizes as its surface is exposed to the high temperature of the combustion by-products. Those skilled in the art will recognize that other materials will suit the purpose of constructing a consumable case as well.

Propulsive Casing Design

In a further alternative embodiment, the consumable case (60') is constructed from a binder-rich mixture of propellant, stiffened into an appropriate shape for the rocket motor casing. In the above embodiment, in which a consumable case design is used, the rocket casing of the motor is consumed as the propellant matrix burns. The casing is consumed because it is exposed to the combustion by-products produced by burning the fuel and the temperature and pressure of these exhaust by-products is sufficient to melt, vaporize, or otherwise consume the casing.

However, in that consumable case design, the energy that consumes the casing of the motor is being taken out of the exhaust gases themselves. By taking energy out of the exhaust gases, the overall energy of the plume is reduced, and the thrust of the rocket is reduced. In effect, a portion of the fuel being burned is being burned solely to provide the energy necessary to consume the motor casing, and is therefore not providing any thrust to the vehicle.

By using a propellant mixture to construct the motor casing, the consumption of the case will not require energy from the exhaust plume. In fact, the consumption of the case will add more energy to the exhaust gases. By using a propellant mixture that is higher in binder than the mixture used in the propellant grain (70), the case can be designed to burn more slowly than the primary fuel, so that the case remains intact at points still above the burn-front (90').

Booster System

Figure 5D:
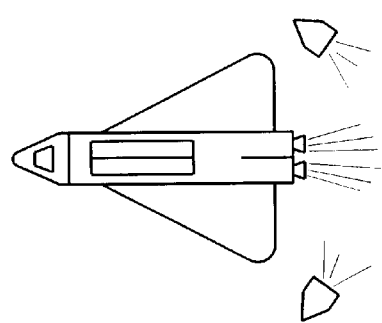
FIGS. 5A–5D a sequence showing a use of consumable case solid rocket motors as boosters for another payload delivery system in schematic form.
Figure 5C:
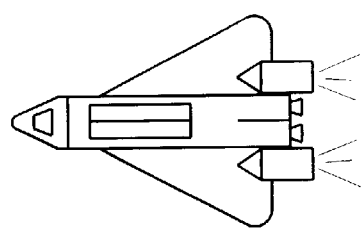
Figure 5B:
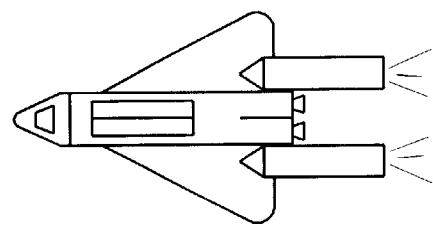
Figure 5A:
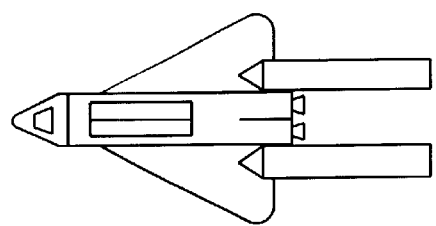

Multiple consumable case rockets are used as boosters for a separate payload delivery system in a further preferred embodiment of the present invention. The operation of such a system is shown sequentially in FIG. 5. A plurality of consumable case rocket motors (200) are mounted to the body of a payload delivery system (210), shown schematically in FIG. 5A. Examples of such payload delivery systems include, but are not limited to, additional solid fueled rockets, upper stage rockets using liquid or solid fuels ignited during or after the burn of the or orbital vehicles such as the Space Shuttle.

Each consumable case booster motor (200) is substantially the same as the consumable case rocket vehicle described above and shown in FIG. 3 and FIG. 4. Instead of each rocket motor providing thrust to separate payloads, however, they are mounted to the payload delivery system so as to provide thrust to accelerate said system instead. Their individual operation is substantially similar to that of the consumable case solid rocket motor described above. Their use in concert with a separate payload delivery system can be seen in FIG. 5B and FIG. 5C. As can be seen, the booster burns away as the propellant is consumed, leaving the least mass behind to be accelerated. This is substantially similar to the advantage described for a single, consumable case rocket above.

An additional benefit to using a consumable case design for booster rockets concerns jettisoning the spent booster rockets. Shortly prior to the burnout of the booster motors (200), they are separated from the payload delivery system, which will continue under its own power. This is shown schematically in FIG. 5D. Normally, once the fuel is consumed, the remaining structure of the booster, including the casing, nozzle, and attachment and control means, would be separated from the payload delivery system. Once separated, they must be safely directed away from the flight path of the payload delivery system in order to prevent the booster rocket from interfering with the flight of the payload delivery system. Such interference might be caused by a collision or other contact between the booster rocket and payload delivery system. Another potential interference occurs if the abrupt jettisoning of the mass of the booster unbalances the payload delivery system in some way. Still another potential interference occurs if the exhaust gas or other airflow associated with the booster rocket acts against the payload delivery system and pushes it out of proper attitude.

By using a consumable case booster rocket motor, only the smallest and lightest possible rocket remains at burnout, meaning that only this smallest possible unit needs to be jettisoned. This minimizes the potential interference with the flight of the payload delivery system that could be caused during and immediately after the jettisoning process.

Those skilled in the art will appreciate that the usage of such nozzleless rockets is not limited to the applications described herein, but rather that they may be effectively used in place of traditional solid rocket motors whenever the mass advantage of eliminating the nozzle sufficiently compensates for any loss of efficiency in the expansion of the exhaust plume.

What is claimed is:

1. A solid rocket moor comprising an outer propellant matrix and an inner propellant matrix, said outer propellant matrix being fastened to a payload and formed into a rocket casing, and said inner propellant matrix being contained within the outer propellant matrix, wherein both of said propellant matrices comprise a substantially homogeneous mixture of metallic fuel particles embedded in a matrix of solid oxidizer wherein the average distance between the metallic fuel particles is controlled, and the burn rate of said inner propellant matrix is greater than the burn rate of the outer propellant matrix.

2. A solid rocket motor comprising a rocket casing and a combustible propellant matrix, said rocket casing being mounted to a payload for acceleration, and providing some number of exhaust apertures at an exhaust end, and said combustible propellant matrix held within said rocket casing, the combustion of said propellant producing exhaust gases which are expelled from the casing through the exhaust apertures into the ambient environment, wherein the propellant matrix comprises a substantially homogeneous mixture of fuel particles distributed throughout a matrix of solid oxidizer, and wherein the rocket casing is constructed from a consumable material such that any portion of the casing exposed to the exhaust gases will burn away, the consumable material comprising a substantially homogeneous mixture of fuel particles distributed throughout a matrix of solid oxidizer, said mixture having a slower burning rate than that of the propellant matrix contained within said rocket casing.

3. A system to accelerate a payload delivery means comprising a payload delivery means for carrying cargo to a designated speed or location, and one or more solid fueled booster rockets, each of said booster rockets comprising a connection to the payload delivery means and a rocket motor, said rocket motor comprising a rocket casing and a propellant matrix, said rocket casing providing some number of exhaust apertures, and said propellant matrix being contained within said rocket casing, such that the combustion of said propellant matrix produces high pressure exhaust gases which are expelled from the casing through the exhaust apertures into the ambient environment, wherein said propellant matrix comprises an intimate stoichiometric mixture of oxidizer and metallic fuel particles and wherein the rocket casing of any solid rocket booster motor is constructed from a consumable material such that any portion of said casing exposed to the exhaust gases will burn away, the consumable material from which the casing of any solid booster motor is constructed comprising a substantially homogeneous mixture of fuel particles distributed throughout a matrix of solid oxidizer, said mixture having a slower burning rate than that of the propellant matrix contained within the rocket casing.

4. A solid rocket motor as in claim 2, wherein a cross sectional area of the exhaust aperture is configured such that the exhaust gas flow through the exhaust aperture is not substantially constricted by its passage through the aperture.

5. A system to accelerate a payload delivery means as in claim 3, wherein a cross sectional area of each exhaust aperture is configured such that the exhaust gas flow from each booster rocket motor's exhaust aperture is not constricted by its passage through the aperture.

* * * * *